(12) United States Patent
Zhang

(10) Patent No.: US 8,218,690 B1
(45) Date of Patent: Jul. 10, 2012

(54) TIMING OFFSET COMPENSATION FOR HIGH THROUGHPUT CHANNEL ESTIMATION

(75) Inventor: Ning Zhang, Saratoga, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 786 days.

(21) Appl. No.: 12/240,473

(22) Filed: Sep. 29, 2008

(51) Int. Cl.
*H04L 27/06* (2006.01)

(52) U.S. Cl. ........ 375/340; 375/260; 375/262; 375/267; 375/316; 375/341; 375/344; 375/150; 375/326; 375/347

(58) Field of Classification Search ........... 375/340, 375/260, 262, 267, 316, 346, 347, 344; 370/204, 370/208, 209, 334, 467, 474
See application file for complete search history.

(56) References Cited

U.S. PATENT DOCUMENTS

| 5,659,691 | A | 8/1997 | Durward et al. |
| 5,675,721 | A | 10/1997 | Freedman et al. |
| 5,736,982 | A | 4/1998 | Suzuki et al. |
| 5,950,202 | A | 9/1999 | Durward et al. |
| 6,012,092 | A | 1/2000 | Cuomo et al. |
| 6,032,033 | A | 2/2000 | Morris et al. |
| 6,128,276 | A | 10/2000 | Agee |
| 6,219,045 | B1 | 4/2001 | Leahy et al. |
| 6,522,898 | B1 | 2/2003 | Kohno et al. |
| 6,563,858 | B1 | 5/2003 | Fakatselis et al. |
| RE38,287 | E | 10/2003 | Freedman et al. |
| 6,654,340 | B1 | 11/2003 | Jones et al. |
| 6,772,195 | B1 | 8/2004 | Hatlelid et al. |
| 7,366,089 | B2 | 4/2008 | Tehrani et al. |
| 2002/0172269 | A1 | 11/2002 | Xu |
| 2003/0002471 | A1 | 1/2003 | Crawford et al. |
| 2003/0072397 | A1 | 4/2003 | Kim et al. |
| 2003/0086366 | A1 | 5/2003 | Branlund et al. |
| 2003/0165187 | A1 | 9/2003 | Tesfai et al. |
| 2003/0177187 | A1 | 9/2003 | Levine et al. |
| 2004/0072546 | A1 | 4/2004 | Sugar et al. |
| 2004/0086055 | A1 | 5/2004 | Li |
| 2004/0087275 | A1 | 5/2004 | Sugar et al. |
| 2004/0103148 | A1 | 5/2004 | Aldrich |
| 2004/0114506 | A1 | 6/2004 | Chang et al. |
| 2004/0128350 | A1 | 7/2004 | Topfl et al. |

(Continued)

FOREIGN PATENT DOCUMENTS

EP 0622911 11/1994

(Continued)

OTHER PUBLICATIONS

"U.S. Appl. No. 12/031,634 Office Action", Apr. 29, 2011, 13 pages.

(Continued)

*Primary Examiner* — Dhaval Patel
(74) *Attorney, Agent, or Firm* — DeLizio Gilliam, PLLC

(57) ABSTRACT

A mechanism for performing timing offset compensation for channel estimation in a receiver of a wireless device. A timing offset associated with a received RF signal is estimated based on an estimated carrier frequency offset for the received RF signal. An integer multiple of the estimated timing offset is applied to each of a plurality of high throughput long training field (HT-LTF) symbols associated with the received RF signal to compensate for the timing offset associated with the received RF signal. Channel estimation is performed using the plurality of HT-LTF symbols compensated for the timing offset associated with the received RF signal.

22 Claims, 5 Drawing Sheets

U.S. PATENT DOCUMENTS

| | | |
|---|---|---|
| 2004/0136466 A1 | 7/2004 | Tesfai et al. |
| 2004/0209579 A1 | 10/2004 | Vaidyanathan |
| 2005/0053170 A1 | 3/2005 | Catreux et al. |
| 2005/0078649 A1 | 4/2005 | Tehrani et al. |
| 2005/0084025 A1* | 4/2005 | Chen ............................ 375/260 |
| 2005/0138671 A1 | 6/2005 | Love et al. |
| 2005/0152314 A1 | 7/2005 | Sun et al. |
| 2005/0233709 A1 | 10/2005 | Gardner et al. |
| 2005/0276347 A1 | 12/2005 | Mujtaba et al. |
| 2006/0007898 A1 | 1/2006 | Maltsev et al. |
| 2006/0029168 A1 | 2/2006 | Chuang et al. |
| 2006/0140303 A1 | 6/2006 | Egashira et al. |
| 2006/0146869 A1 | 7/2006 | Zhang et al. |
| 2006/0250943 A1 | 11/2006 | Mujtaba et al. |
| 2006/0251193 A1 | 11/2006 | Kopmeiners et al. |
| 2006/0280154 A1 | 12/2006 | Kwon et al. |
| 2007/0041322 A1 | 2/2007 | Choi et al. |
| 2007/0053452 A1 | 3/2007 | Koo et al. |
| 2007/0189263 A1* | 8/2007 | Izumi et al. .................... 370/350 |
| 2007/0204052 A1 | 8/2007 | Trainin et al. |
| 2007/0207823 A1 | 9/2007 | Nee et al. |
| 2007/0230403 A1 | 10/2007 | Douglas et al. |
| 2007/0286062 A1* | 12/2007 | Gupta ........................... 370/203 |
| 2007/0298742 A1 | 12/2007 | Ketchum et al. |
| 2008/0045153 A1 | 2/2008 | Surineni et al. |
| 2008/0089450 A1* | 4/2008 | Zelst et al. .................... 375/344 |
| 2008/0225761 A1 | 9/2008 | Zhang |
| 2009/0052433 A1 | 2/2009 | DiRenzo et al. |
| 2009/0122882 A1 | 5/2009 | Mujtabe |
| 2010/0189167 A1 | 7/2010 | Pare, Jr. et al. |

FOREIGN PATENT DOCUMENTS

| | | |
|---|---|---|
| EP | 1185048 | 3/2002 |
| EP | 1220505 | 7/2002 |
| EP | 1231722 | 8/2002 |
| WO | WO-0077961 | 12/2000 |
| WO | WO-03023995 | 3/2003 |
| WO | WO-03075396 | 9/2003 |

OTHER PUBLICATIONS

Chen, Ruiqi et al., "Symbol Timing and Channel Estimation of IEEE802.11a based on OFDM", *IEEE Canadian Conference on Electrical and Computer Engineering*, vol. 3 May 4-7, 2003, pp. 1547-1550.

Schmidl, T.M. et al., "Robust Frequency and Timing Synchronization for OFDM", *IEEE Transactions on Communications*, vol. 45 No. 12 Dec. 1997, pp. 1613-1621.

"U.S. Appl. No. 12/031,634 Final OA", Aug. 22, 2011, 6 pages.

* cited by examiner

TIMING OFFSET COMPENSATION FOR HIGH THROUGHPUT CHANNEL ESTIMATION

BACKGROUND

Embodiments of the inventive subject matter generally relate to the field of wireless communication networks, and more particularly, to techniques for compensating timing offset for high throughput channel estimation.

Wireless communication systems can use one or more channels to transfer data between a transmitter and receivers. These communication systems can operate according to a set of standards, defined by the Institute of Electrical and Electronics Engineers (IEEE) 802.11 committee, for Wireless Local Area Network (WLAN) communication. The 802.11 standards may define a modulation and coding scheme, a packet format including a preamble and a payload, and other guidelines to enable effective transmission and to minimize interference with other transmitting devices (e.g., cellular phones). The 802.11n is a proposed amendment to the 802.11 standard used to implement multiple input multiple output (MIMO) communication to increase network throughput and may be facilitated by the use of multiple transmit and receive antennas.

SUMMARY

Various embodiments are disclosed of a wireless receiver comprising a mechanism for performing timing offset compensation for channel estimation. In one embodiment, the wireless receiver comprises a timing offset compensation unit operable to estimate a timing offset associated with a received RF signal based on an estimated carrier frequency offset for the received RF signal. The timing offset compensation unit is operable to apply an integer multiple of the estimated timing offset to each of a plurality of high throughput long training field (HT-LTF) symbols associated with the received RF signal to compensate for the timing offset associated with the received RF signal. The wireless receiver further comprises a channel estimation unit operable to perform channel estimation using the plurality of HT-LTF symbols compensated for the timing offset associated with the received RF signal.

BRIEF DESCRIPTION OF THE DRAWINGS

The present embodiments may be better understood, and numerous objects, features, and advantages made apparent to those skilled in the art by referencing the accompanying drawings.

DESCRIPTION OF THE EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, well-known instruction instances, protocols, structures, and techniques have not been shown in detail in order not to obfuscate the description.

Transmitted radio frequency (RF) signals are often corrupted by various impairments, as they pass through a communication channel (e.g., free space). The transmitted signals may be corrupted by noise (e.g., thermal noise, atmospheric noise), interference with other signals, phase and frequency distortion, attenuation, etc. before they are received by one or more receiver units. A receiver unit can determine channel estimates to counter the effect of the communication channel on information symbols in a received RF signal. Channel estimates describe the effect (attenuation, distortion, etc.) of the communication channel on signals that pass through it. Training symbols are a set of one or more known symbols and are typically transmitted along with the information symbols to enable the receiver unit to estimate the channel. In some variations, a communication system can include multiple transmitters transmitting multiple training symbols. Improper synchronization between the transmitter and the receiver units can result in timing offset and carrier frequency offset in the received RF signal. Timing and carrier frequency offset can lead to incorrect sampling of the received signal, non-orthogonal received symbols, inaccurate channel estimates, incorrect decoding of the received RF signal, and receiver performance degradation. Correcting the timing and carrier frequency offset in the received RF signal can ensure that the channel estimates are accurate. This can minimize receiver performance degradation.

Wireless communication systems can operate according to a set of standards, defined by the Institute of Electrical and Electronics Engineers (IEEE) 802.11 committee, for Wireless Local Area Network (WLAN) communication. The 802.11n proposed amendment to the 802.11 standard is used to implement multiple input multiple output (MIMO) communication and may be facilitated by the use of multiple transmit and receive antennas. This proposed amendment defines how multiple transmitters may be used to transmit data over multiple channels to improve network throughput and increase the data rate. The IEEE 802.11n proposed amendment also defines a packet format (including a preamble and a payload comprising information symbols) further described in FIG. 1.

Figure 1:
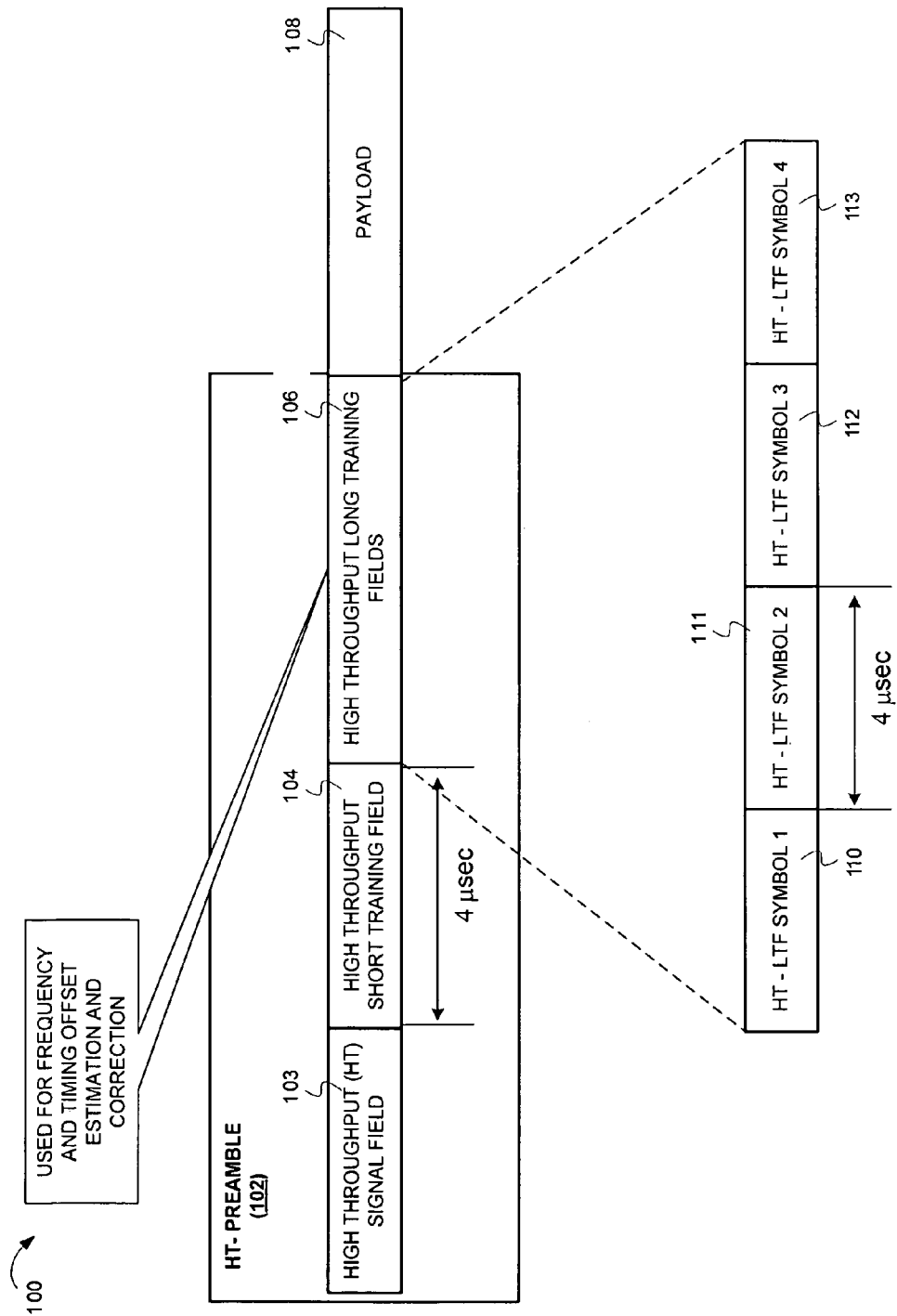
FIG. 1 illustrates an exemplary format of a packet transmitted in a MIMO environment.

FIG. 1 illustrates an exemplary format of a packet transmitted in a MIMO environment. As shown in FIG. 1, the packet typically includes a high throughput (HT) preamble 102 and a payload 108. In some embodiments, multiple transmit antennas may transmit packets with the same (duplicated) preamble and a different payload. In other embodiments, multiple antennas may transmit packets with a different preamble and payload.

The HT preamble 102 includes an HT signal field 103, an HT short training field (HT-STF) 104, and HT long training fields (HT-LTF) 106. The HT signal field 103 can include information used for interpreting packet formats. For example, the HT signal field 103 can indicate the packet's modulation and coding scheme, bandwidth (e.g., 20 MHz, 40 MHz), number of data bytes in the payload, additional coding schemes (e.g., LDPC coding, STBC coding, etc.), number of HT-LTFs, cyclic redundancy check (CRC) information, etc. The HT-STF (104) can be 4 microseconds long and can be used for automatic gain control (AGC) training in a MIMO system. In some instances, the HT-STF (104) may also be used for packet detection.

The HT-LTF 106 can include one to four HT-LTF symbols. In FIG. 1, the HT-LTF training field 106 comprises four HT-LTF symbols 110, 111, 112, and 113. Each of the HT-LTF symbols (e.g., 110) may be 4 microseconds long and may include training bits and a guard interval. The HT-LTF symbols (e.g., 110) can be used for carrier frequency offset estimation and channel estimation. The number of transmitted HT-LTF symbols can depend on the number of space-time streams (which may be related to the number of transmit chains). In some instances, the number of transmitted HT-LTF symbols (e.g., 110) is equal to the number of space-time streams (except in the case of 3 space-time streams, where four HT-LTFs are transmitted). In other instances, the number of transmitted HT-LTF symbols may be greater than the number of space-time streams. For example, four HT-LTF symbols may be transmitted for a single space-time stream. In various implementations, because HT-LTFs 106 may be used to estimate the channel, the number of transmitted HT-LTF symbols may not be less than the number of space-time streams. Thus, for each transmit chain, at least one HT-LTF symbol is transmitted. As shown in FIG. 1, four HT-LTF symbols (110, 111, 112, and 113) are transmitted for four space-time streams.

The payload 108 can include information symbols, a service field (used for scrambler initialization), pad bits, tail bits (e.g., to indication the end of transmission), etc. It should be noted that the packet format described in FIG. 1 is exemplary. The number and length of HT-STF, HT-LTF, and HT signal fields and their order of occurrence in the packet may vary, e.g., depending on the mode of operation. 802.11n systems can operate in a variety of modes (e.g., Green Field mode) to enable backward compatibility with systems using 802.11a/b/g standards. For example, in one embodiment, the HT signal field may be placed between the first and second HT-LTF symbols.

High Throughput (HT) channel estimation can be performed using one or more HT-LTF symbols. The one or more HT-LTF symbols to be transmitted (via multiple antennas) can be multiplied by a mapping matrix to ensure that the HT-LTF symbols transmitted via multiple antennas are orthogonal to each other. The mapping matrix (refer to Eq. 1) is defined as part of the IEEE 802.11n specification.

$$P_{HTLTF} = \begin{pmatrix} 1 & -1 & 1 & 1 \\ 1 & 1 & -1 & 1 \\ 1 & 1 & 1 & -1 \\ -1 & 1 & 1 & 1 \end{pmatrix}. \quad \text{(Eq. 1)}$$

The mapping matrix in Eq. 1 is used when four HT-LTFs are transmitted in the preamble, while a subset of the mapping matrix is used when one or two HT-LTFs are to be transmitted. Ensuring orthogonality between the HT-LTF symbols transmitted via multiple antennas allows for separation of individual HT-LTF symbols at the receiver. However, due to impairments in the transmitter, receiver, and channel, the HT-LTF symbols received via multiple antennas may not be orthogonal to each other. In some instances, the impairments can occur because of poor synchronization between transmitter and receiver, mismatch between transmitter and receiver crystal frequency, multipath, environmental conditions, device constraints, etc. Additionally, the transmitter and receiver impairments may also cause carrier frequency and timing offsets. Carrier frequency offset can result in the loss of orthogonality and cause inter-carrier interference, while timing offset can cause a shift in sampling instants to incorrect points. This can lead to degradation in channel estimation and thus degradation in receiver performance (e.g., inaccurate channel estimates can lead to inaccurately decoded data symbols, etc).

Figure 2:
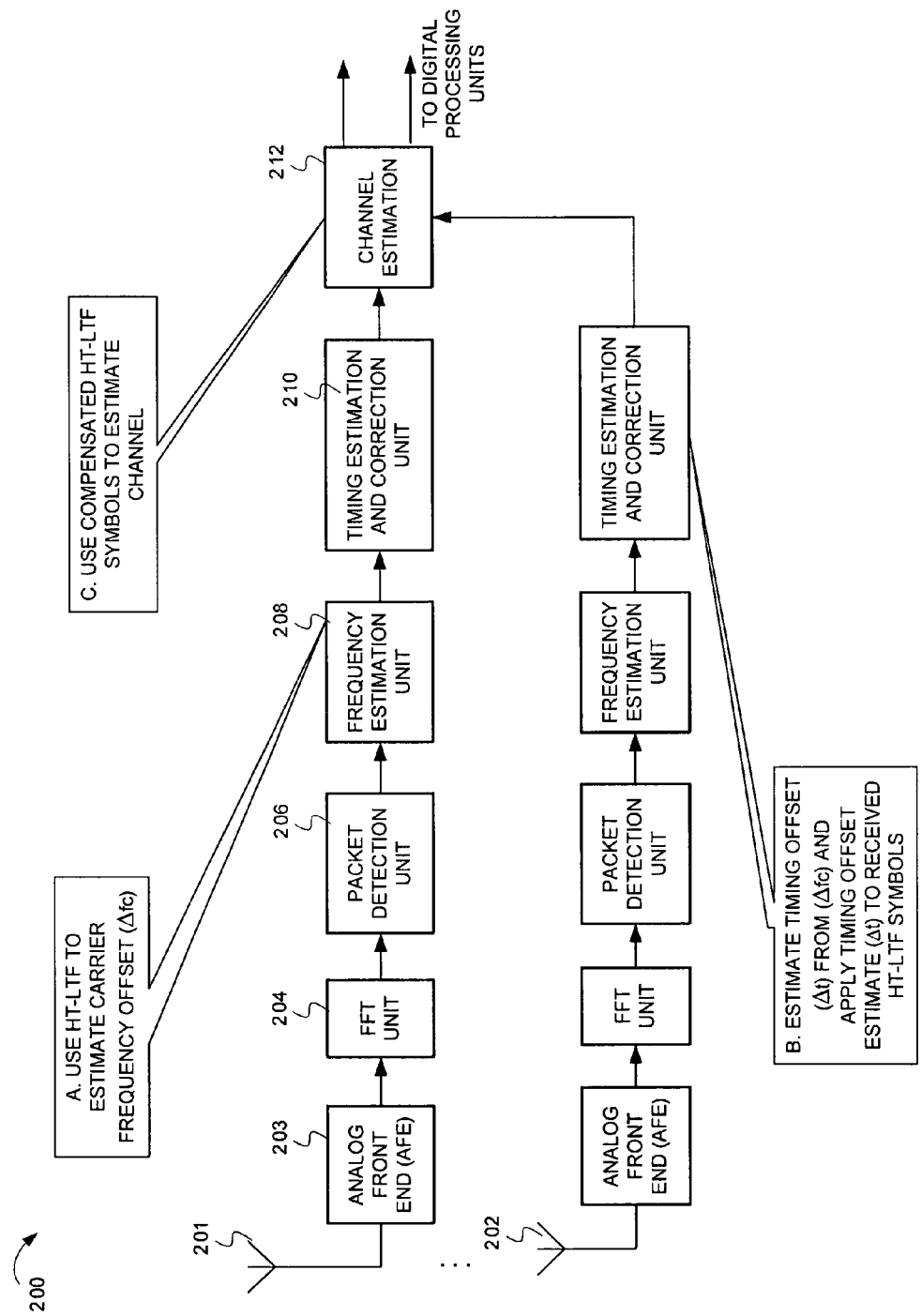
FIG. 2 is a block diagram of one embodiment of a receiver unit configured to estimate and correct timing offset for HT channel estimation.

FIG. 2 is a block diagram of one embodiment of a receiver unit 200 configured to estimate and correct timing offset for HT channel estimation. In one example, the receiver unit 200 may be implemented in a transceiver of a WLAN device. As shown in FIG. 2, the receiver unit 200, in a MIMO system, includes two receive chains with antennas 201 & 202. Each receive chain may include the antenna (e.g., 201), an analog front end (AFE) 203, a Fast Fourier Transform (FFT) unit 204, a packet detection unit 206, a frequency estimation unit 208, and a timing estimation and correction unit 210. The outputs from both chains are fed into a channel estimation unit 212. In some embodiments, the receive unit 200 can include more than two receive antennas and receive chains.

The antenna 201 can receive RF signals and provide the received RF signals to the analog front end 203. The analog front end 203 can include 1) one or more amplifying stages to amplify the received RF signal, 2) one or more filtering stages to remove unwanted bands of frequencies, 3) mixer stages to down-convert the received RF signal, 4) an automatic gain control (AGC) unit to adjust the gain to an appropriate level for a range of received signal amplitude levels, 5) an analog to digital converter (ADC) to convert the received RF signal into a digital signal, etc. After the ADC converts the received RF signal into its digital representation, the FFT unit 204 converts the time domain digital received signal into a frequency domain signal. The packet detection unit 206 may use the HT short training field (HT-STF) in the received signal's preamble to detect an incoming packet. The packet detector can perform self-correlation on the received signal, use a combination of cross correlation (with a known STF symbol) and self-correlation, or use any suitable method to detect the packet.

The frequency estimation unit 208 may use the HT-STF and/or the HT long training fields (HT-LTFs) to estimate a carrier frequency offset in the received signal (indicated in stage A). The carrier frequency offset in the received signal is then corrected using the carrier frequency offset estimate. The carrier frequency offset may be caused by improper synchronization between the crystal frequency generator on the receiver and transmitter. The timing estimation and correction unit 210 estimates a timing offset from the carrier frequency offset estimate. The timing estimation and correction unit 210 can also apply the timing offset estimate to the received HT-LTF symbols (refer to stage B) and compensate for the timing offset. The channel estimation unit 212 can use the compensated HT-LTFs from all the receiver chains to estimate channel coefficients and channel response (indicated in stage C). It is noted that the frequency estimation unit 208, the timing estimation and correction unit 210, and/or the channel estimation unit 212 may be implemented in software and/or hardware.

From the channel estimation unit 212, other digital processing units can use the channel estimates, further process the received symbols, and retrieve one or more information symbols. In one embodiment, subsequent digital processing blocks can include a demodulator, a deinterleaver, a decoder, and other digital components depending on the encoding applied before transmission. In some embodiments, each of the received streams may be individually demodulated and decoded before being multiplexed and descrambled as the final step.

In some instances, timing and carrier frequency offset estimation and correction is performed on the preamble every time a new packet is detected, and not on the payload. Channel estimation may also be performed when a new packet is received. In other instances, channel estimation may be performed after a pre-determined number of packets are received. As described in FIG. 1, the payload including information symbols follows the preamble. In some instances, the carrier frequency and timing offset estimates may be applied to the information symbols, while in other instances, the offset estimates may not be applied to the payload.

Figure 3:
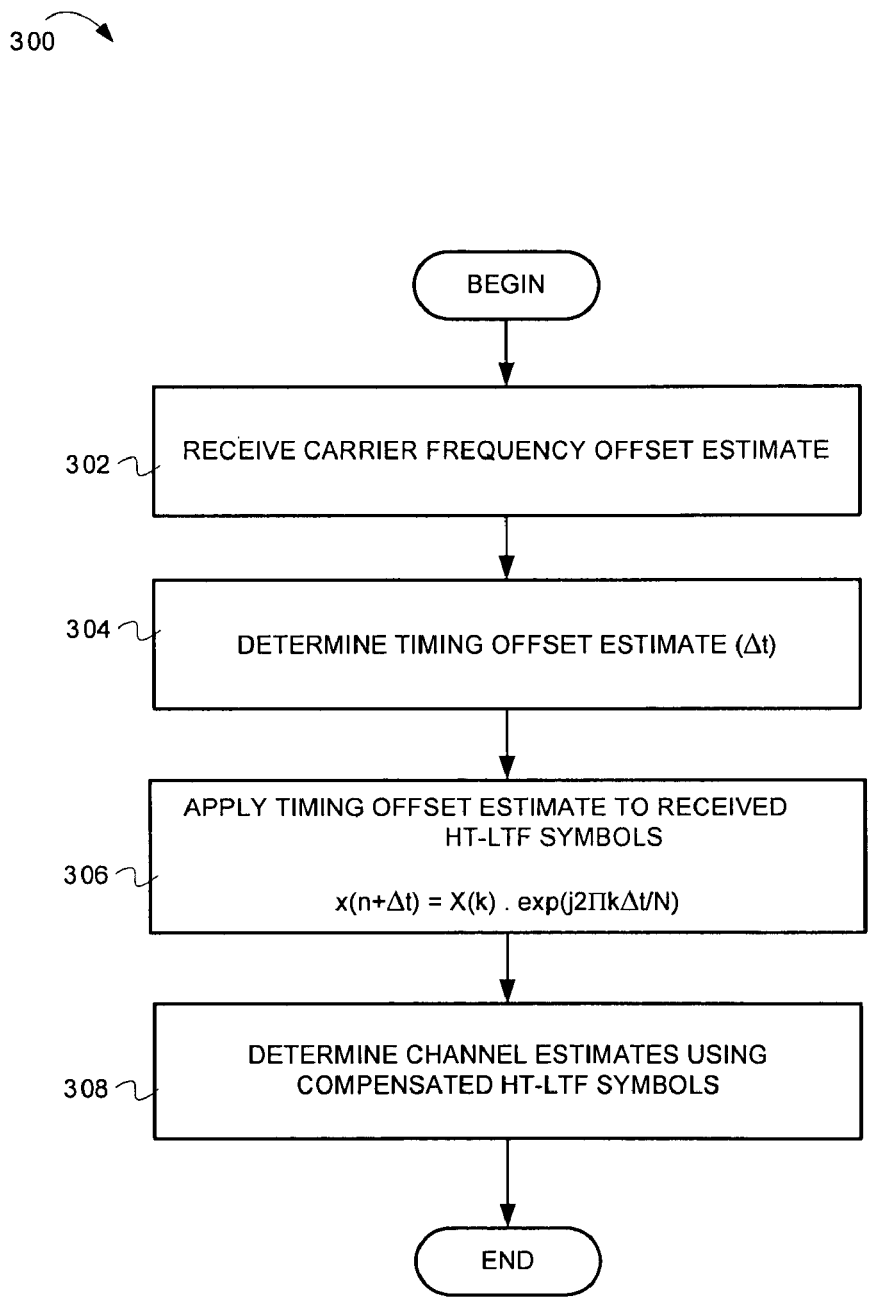
FIG. 3 is a flow diagram illustrating example operations to estimate and correct timing offset for HT channel estimation.

FIG. 3 is a flow diagram illustrating example operations to estimate and correct timing offset for HT channel estimation. The flow 300 begins at block 302.

At block 302, a carrier frequency offset ($\Delta fc$) estimate is received. In one embodiment, an initial carrier frequency offset estimate (also called a coarse frequency estimate) may be determined using one or more short training fields (HT-STFs). Fine frequency estimation techniques can be used to estimate a residual carrier frequency offset and also to generate timing offset estimates. Timing offset may be caused by a shift in a receiver's digital clock frequency. Timing offset can cause a shift in sampling instants to incorrect points and can lead to degradation in receiver performance. In some implementations, assuming that the carrier frequency and the digital clock are locked to the same crystal, fine frequency estimation can be used to generate a timing offset estimate. The measured carrier frequency can be represented by Eq. 2, where fc is the nominal frequency.

$$fc_{measured} = fc(1 + \Delta fc) \quad \text{(Eq. 2)}$$

The carrier frequency offset estimate ($\Delta fc$) is generally expressed as a dimensionless number (e.g., $10^{-10}$). It can be converted into units of frequency (Hz), if the nominal frequency (fc) is known, by multiplying the nominal frequency by the dimensionless carrier frequency offset (i.e., (fc·$\Delta c$) Hz). In one embodiment, the carrier frequency offset estimate ($\Delta fc$)) can be generated from the coarse frequency estimate, one or more long training field symbols (HT-LTFs), the knowledge of inter-symbol boundaries (e.g., transition boundary between HT-STFs and HT-LTFs), and using any suitable optimization algorithm. The flow continues at block 304.

At block 304, the timing offset ($\Delta t$) is estimated. For example, the timing estimation and correction unit 110 can use the carrier frequency offset estimate (received at block 302) to estimate the timing offset. The timing offset is calculated using Eq. 3, where T is the symbol period (i.e., period of the HT-LTF symbol). The flow continues at block 306.

$$\Delta t = T \cdot \frac{(fc \cdot \Delta fc)}{fc} = T \cdot \Delta fc. \quad \text{(Eq. 3)}$$

At block 306, the estimated timing offset ($\Delta t$) is applied to the received long training field (HT-LTF) samples. As described in FIG. 2, the received samples are passed through a Fast Fourier Transform (FFT) unit to convert the samples from the time domain into the frequency domain before the timing offset is estimated and corrected. According to the properties of the Fourier Transform, a time shift (e.g., $\Delta t$) in a time-domain signal transforms into a phase shift (e.g., $e^{-j2\pi k (\Delta t)/N}$) in a frequency domain signal. Thus, it may be possible to compensate for timing offset in the frequency domain, using the time shift property of the Fourier Transform (FT), by applying a phase slope as described in Eq. 4.

$$x(n+\Delta t) \leftrightarrow e^{-j2\pi k(\Delta t)/N} X[k] \quad \text{(Eq. 4)}$$

x(n) is the sampled time domain received signal,
x(n+$\Delta t$) is the sample time domain received signal with a timing offset ($\Delta t$),
X[k] is the Fourier transformed representation of x (n),
k represents the frequency samples, and
N represents the total number of samples.

Figure 4A:
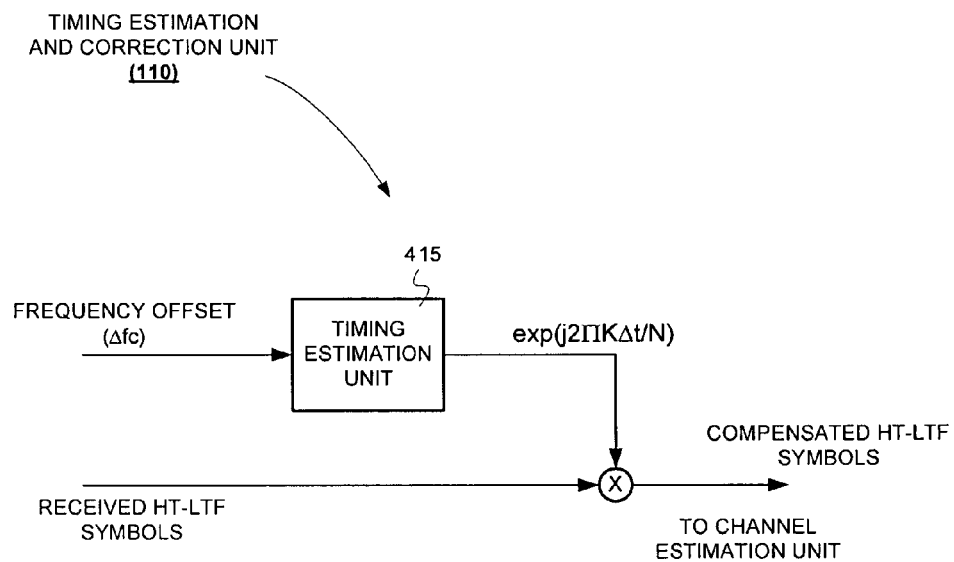
FIG. 4A is a block diagram of one embodiment of a timing estimation and correction unit for determining and correcting timing offset.

This concept of determining and correcting timing offset is further illustrated in FIG. 4A. As shown in FIG. 4A, the timing estimation and correction unit 110 includes a timing estimation unit 415 that uses the carrier frequency offset estimate ($\Delta fc$) to determine the timing offset ($\Delta t$), which is then represented as a phase slope ($e^{-j2\pi k(\Delta t)/N}$). The phase slope is multiplied with the received HT-LTF symbols, thus compensating for the timing offset. The compensated HT-LTF symbols can be used to estimate the channel.

Figure 4B:
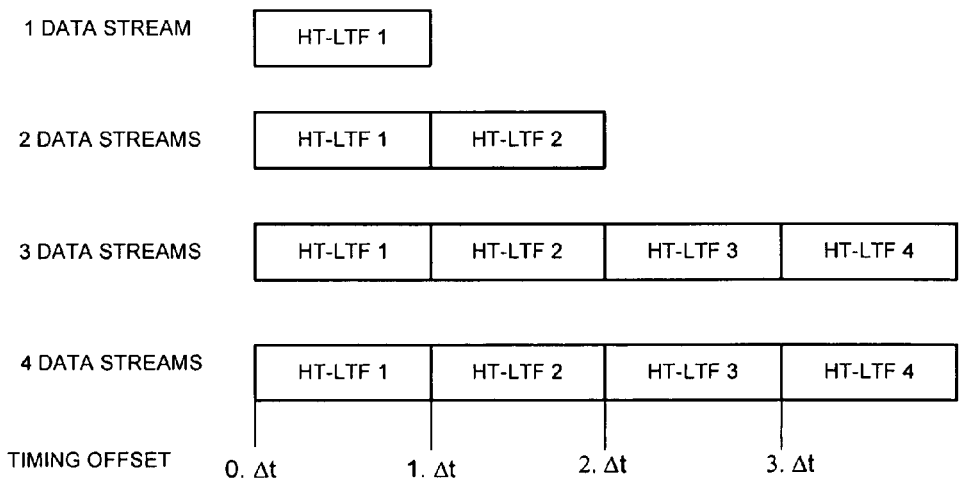
FIG. 4B is an example conceptual diagram illustrating timing offset correction.

FIG. 4B is an example conceptual diagram illustrating timing offset correction. As shown in FIG. 4B, the number of data streams can influence the number of long training fields (HT-LTFs) transmitted in the preamble. For example, only 1 HT-LTF may be transmitted in the case of a single data stream, while two HT-LTFs may be transmitted when transmitting two data streams. In some cases, orthogonality is considered for determining the number of HT-LTFs to be transmitted in the preamble. For instance, in one example, four HT-LTFs are used for data transmission using 3 and 4 data streams.

In some implementations, the timing offset applied to the first HT-LTF may be a reference value (e.g., zero or some other finite value like ($\Delta t$)). The timing offset applied to the first HT-LTF can set a reference for the rest of the packet, as only relative timing offset may be considered in some implementations for HT channel estimation. In various instances, the timing offset applied to each HT-LTF is an integer multiple of the timing offset estimate ($\Delta t$). The integers can be consecutive integers and may correspond to the sequence of the received HT-LTF symbols. As shown in FIG. 4B, for four transmitted data streams (with four HT-LTFs transmitted in the preamble), in one embodiment, the timing offset ($\Delta t$) may be applied as follows—timing offset applied to HT-LTF 1 may be zero (0*$\Delta t$), timing offset applied to HT-LTF 2 may be $\Delta t$ (1*$\Delta t$), timing offset applied to HT-LTF 3 may be 2*$\Delta t$, and the timing offset applied to HT-LTF 4 may be 3*$\Delta t$. In another embodiment, the timing offsets applied to the sequence of HT-LTFs may be reversed, e.g., the timing offset applied to HT-LTF 4 may be zero (0*–$\Delta t$), the timing offset applied to HT-LTF 3 may be (–$\Delta t$) (1*–$\Delta t$), timing offset applied to HT-LTF 2 may be 2*–$\Delta t$, and the timing offset applied to HT-LTF1 may be 3*–$\Delta t$. The negative sign (i.e., –$\Delta t$) indicates a time reversal. Referring back to FIG. 3, the flow continues at block 308.

At block 308, channel estimates are obtained using the compensated HT-LTF symbols. The HT-LTF symbols used for channel estimation are compensated for carrier frequency and timing offsets. Various methods can be used to estimate the channel coefficients and hence the channel response. In one embodiment, at the transmitter's side, the HT-LTF symbols may be encoded using a mapping matrix (refer to Eq. 1) described in the IEEE 802.11n specification. To illustrate how channel estimates can be obtained using the compensated HT-LTFs, an example using 2 orthogonal HT-LTFs (for two data streams) and a two-transmitter, two-receiver scenario is described below. At the transmitter's end, the HT-LTFs to be transmitted are mapped onto a 2×2 sub-matrix (refer to Eq. 5) obtained from the original 4×4 mapping matrix (refer to Eq. 1).

$$P_{HT-LTF(2x2)} = \begin{bmatrix} 1 & -1 \\ 1 & 1 \end{bmatrix} \quad \text{(Eq. 5)}$$

After the HT-LTFs (HT-LTF1 and HT-LTF2) for the two transmitter streams are made orthogonal to each other (via the mapping matrix), the HT-LTFs to be transmitted are of the following format:

Transmitter 1: HT_LTF1, −(HT_LTF2);
Transmitter 2: HT_LTF1, HT_LTF2.

The transmitted signal traverses the channels ($h_{i,j}$), where $h_{i,j}$ represents the channel between the $i^{th}$ transmitter and the $j^{th}$ receiver. The symbols received at the received antennas are a combination of the symbols from each of the transmit antennas. The received symbols may be processed, compensated for carrier frequency offset, (as described in FIG. 2), and timing offset (described in flow 300) to obtain compensated HT-LTF symbols. The compensated received symbols can be represented as follows.

Receiver 1: Compensated Symbol $1=r_{11}=h_{11}HT\_LTF1+h_{21}HT\_LTF1$;
Receiver 1: Compensated Symbol $2=r_{12}=h_{11}HT\_LTF2+h_{21}HT\_LTF2$;
Receiver 2: Compensated Symbol $1=r_{21}=h_{12}HT\_LTF1+h_{22}HT\_LTF1$;
Receiver 2: Compensated Symbol $2=r_{22}=-h_{12}HT\_LTF2+h_{22}HT\_LTF2$.

The channel coefficients can be determined by performing linear operations on two or more received symbols. For example:

$$h_{11}=r_{11}-r_{12};$$

$$h_{21}=r_{11}+r_{12};$$

$$h_{12}=r_{21}-r_{22};$$

$$h_{22}=r_{21}+r_{22}.$$

Although the process of channel estimation has been described using two HT-LTF symbols, this process can be extended to any number of HT-LTF symbols, transmit and receive antennas, and communication channels. This process can also be expanded to include future expansions of the IEEE standard including more than four HT-LTFs. From block 308, the flow ends.

It should be understood that the depicted flow diagram are examples meant to aid in understanding embodiments and should not be used to limit embodiments or limit scope of the claims. Embodiments may perform additional operations, fewer operations, operations in a different order, operations in parallel, and some operations differently.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
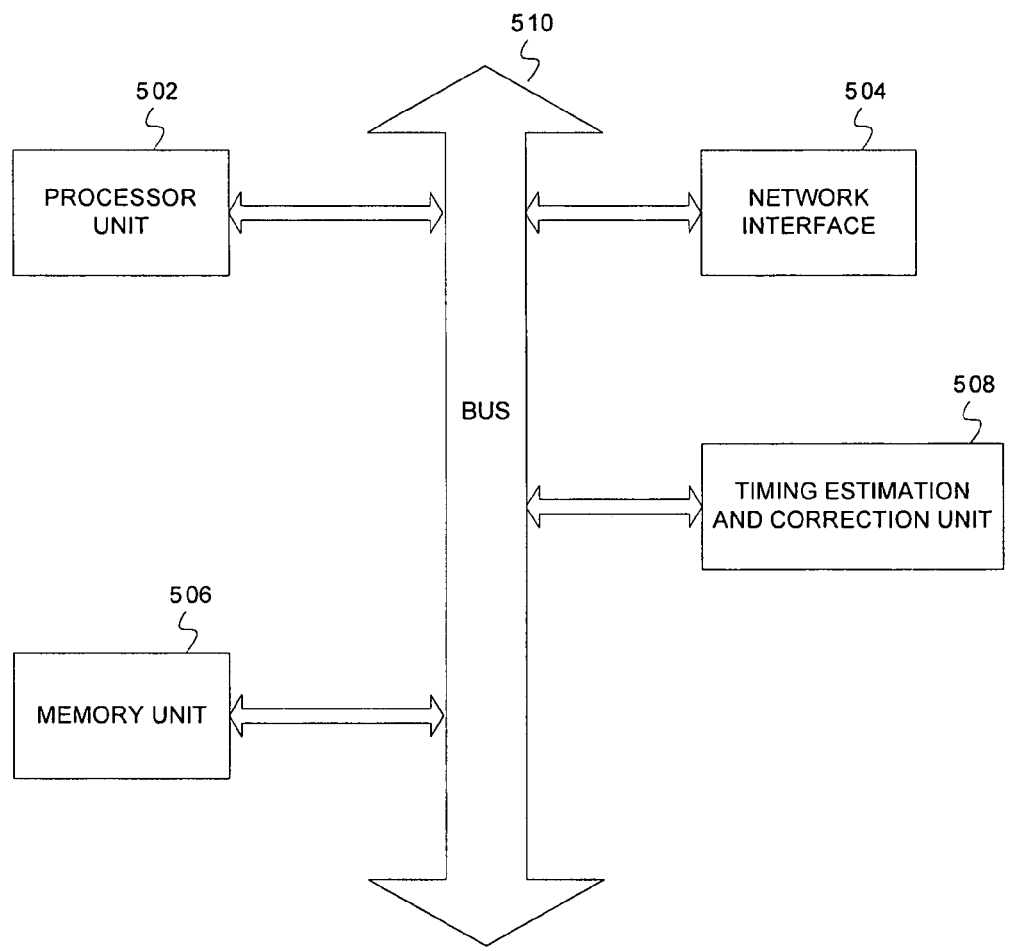
FIG. 5 is a block diagram of one embodiment of a wireless device including a mechanism for estimating and correcting timing offset for HT channel estimation.

FIG. 5 is a block diagram of one embodiment of a wireless device including a mechanism for estimating and correcting timing offset for HT channel estimation. In one implementation, the wireless device may be a WLAN device. The WLAN device includes a processor unit 502 (possibly including multiple processors, multiple cores, multiple nodes, and/or implementing multi-threading, etc.). The WLAN device includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The WLAN device also includes a bus 510 (e.g., PCI, ISA, PCI-Express, HyperTransport®, InfiniBand®, NuBus, etc.), and network interfaces 504 that include at least one wireless network interface (e.g., a WLAN interface, a Bluetooth® interface, a WiMAX interface, a ZigBee° interface, a Wireless USB interface, etc.). The WLAN device also includes a timing estimation and correction unit 508 that estimates a timing offset from a received carrier frequency offset estimate. The timing estimation and correction unit 508 applies this estimated timing offset, to correct the received HT-LTF symbols for HT channel estimation, as described above with reference to FIGS. 1-4B. Any one of the above-described functionalities may be partially (or entirely) implemented in hardware and/or on the processing unit 502. For example, the functionality may be implemented with an application specific integrated circuit, in logic implemented in the processing unit 502, in a co-processor on a peripheral device or card, etc. Further, realizations may include fewer or additional components not illustrated in FIG. 5 (e.g., additional network interfaces, peripheral devices, etc.). The processor unit 502 and the network interfaces 504 are coupled to the bus 510. Although illustrated as being coupled to the bus 510, the memory 506 may be coupled to the processor unit 502.

While the embodiments are described with reference to various implementations and exploitations, it will be understood that these embodiments are illustrative and that the scope of the inventive subject matter is not limited to them. In general, the timing offset estimation and correction techniques as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for implementing timing offset compensation for channel estimation comprising:
    estimating a timing offset associated with a received RF signal based on an estimated carrier frequency offset for the received RF signal;
    applying an integer multiple of the estimated timing offset to each of a plurality of high throughput long training field (HT-LTF) symbols associated with the received RF signal to compensate for the timing offset associated with the received RF signal; and
    performing channel estimation using the plurality of HT-LTF symbols compensated for the timing offset associated with the received RF signal.

2. The method of claim 1, wherein said estimating the timing offset associated with the received RF signal based on the estimated carrier frequency offset comprises estimating the timing offset by multiplying the estimated carrier frequency offset with a period of an HT-LTF symbol associated with the received RF signal.

3. The method of claim 1, wherein said applying an integer multiple of the estimated timing offset to each of the plurality of HT-LTF symbols associated with the received RF signal comprises applying consecutive integer multiples of the estimated timing offset to the plurality of HT-LTF symbols.

4. The method of claim 3, wherein, when the received RF signal comprises a sequence of four HT-LTF symbols, said applying an integer multiple of the estimated timing offset ($\Delta t$) to each of the plurality of HT-LTF symbols associated with the received RF signal comprises applying a timing offset of $0*\Delta t$ to a first HT-LTF symbol of the sequence of four HT-LTF symbols, applying a timing offset of $1*\Delta t$ to a second HT-LTF symbol, applying a timing offset of $2*\Delta t$ to a third HT-LTF symbol, and applying a timing offset of $3*\Delta t$ to a fourth HT-LTF symbol.

5. The method of claim 1, wherein said applying an integer multiple of the estimated timing offset to each of the plurality of HT-LTF symbols associated with the received RF signal to compensate for the timing offset associated with the received RF signal comprises, for each HT-LTF symbol, calculating a frequency domain phase slope based on a corresponding integer multiple of the estimated timing offset, and multiplying the calculated frequency domain phase slope with a frequency domain representation of the HT-LTF symbol.

6. The method of claim 1, further comprising compensating for a carrier frequency offset associated with the received RF signal using the estimated carrier frequency offset, and performing channel estimation using the plurality of HT-LTF symbols compensated for the carrier frequency offset and the timing offset associated with the received RF signal.

7. A wireless receiver comprising:
    a processor;
    a network interface coupled with the processor;
    a timing offset compensation unit coupled with the processor and the network interface, the timing offset compensation unit operable to estimate a timing offset associated with a received RF signal based on an estimated carrier frequency offset for the received RF signal;
    the timing offset compensation unit further operable to apply an integer multiple of the estimated timing offset to each of a plurality of high throughput long training field (HT-LTF) symbols associated with the received RF signal to compensate for the timing offset associated with the received RF signal; and
    a channel estimation unit coupled with the processor and the network interface, the channel estimation unit operable to perform channel estimation using the plurality of HT-LTF symbols compensated for the timing offset associated with the received RF signal.

8. The wireless receiver of claim 7, wherein the timing offset compensation unit is operable to estimate the timing offset associated with the received RF signal by multiplying the estimated carrier frequency offset with a period of an HT-LTF symbol associated with the received RF signal.

9. The wireless receiver of claim 7, wherein the timing offset compensation unit is operable to apply consecutive integer multiples of the estimated timing offset to the plurality of HT-LTF symbols associated with the received RF signal to compensate for the timing offset associated with the received RF signal.

10. The wireless receiver of claim 9, wherein, when the received RF signal comprises a sequence of four HT-LTF symbols, the timing offset compensation unit is operable to apply an integer multiple of the estimated timing offset ($\Delta t$) to each of the plurality of HT-LTF symbols associated with the received RF signal by applying a timing offset of $0*\Delta t$ to a first HT-LTF symbol of the sequence of four HT-LTF symbols, applying a timing offset of $1*\Delta t$ to a second HT-LTF symbol, applying a timing offset of $2*\Delta t$ to a third HT-LTF symbol, and applying a timing offset of $3*\Delta t$ to a fourth HT-LTF symbol.

11. The wireless receiver of claim 7, wherein the timing offset compensation unit is operable to apply an integer multiple of the estimated timing offset to each of the plurality of HT-LTF symbols associated with the received RF signal to compensate for the timing offset associated with the received RF signal by calculating, for each HT-LTF symbol, a frequency domain phase slope based on a corresponding integer multiple of the estimated timing offset, and multiplying the calculated frequency domain phase slope with a frequency domain representation of the HT-LTF symbol.

12. The wireless receiver of claim 7, further comprising a carrier frequency compensation unit operable to determine the estimated carrier frequency offset and compensate for a carrier frequency offset associated with the received RF signal using the estimated carrier frequency offset, wherein the channel estimation unit is operable to perform channel estimation using the plurality of HT-LTF symbols compensated for the carrier frequency offset and the timing offset associated with the received RF signal.

13. One or more machine-readable storage media having stored therein a program product, which when executed by one or more processors causes the one or more processors to perform operations that comprise:
  estimating a timing offset associated with a received RF signal based on an estimated carrier frequency offset for the received RF signal;
  applying an integer multiple of the estimated timing offset to each of a plurality of high throughput long training field (HT-LTF) symbols associated with the received RF signal to compensate for the timing offset associated with the received RF signal; and
  performing channel estimation using the plurality of HT-LTF symbols compensated for the timing offset associated with the received RF signal.

14. The machine-readable storage media of claim 13, wherein the operations further comprise estimating the timing offset associated with the received RF signal by multiplying the estimated carrier frequency offset with a period of an HT-LTF symbol associated with the received RF signal.

15. The machine-readable storage media of claim 13, wherein the operations further comprise applying consecutive integer multiples of the estimated timing offset to the plurality of HT-LTF symbols associated with the received RF signal to compensate for the timing offset associated with the received RF signal.

16. The machine-readable storage media of claim 13, wherein the operations further comprise applying an integer multiple of the estimated timing offset to each of the plurality of HT-LTF symbols associated with the received RF signal to compensate for the timing offset associated with the received RF signal by calculating, for each HT-LTF symbol, a frequency domain phase slope based on a corresponding integer multiple of the estimated timing offset, and multiplying the calculated frequency domain phase slope with a frequency domain representation of the HT-LTF symbol.

17. A wireless local area network (WLAN) device comprising:
  a transmitter operable to transmit RF signals via a network;
  a receiver coupled to the transmitter and configured to receive RF signals via the network, wherein the receiver comprises:
  a timing offset compensation unit operable to estimate a timing offset associated with a received RF signal based on an estimated carrier frequency offset for the received RF signal, wherein the timing offset compensation unit is operable to apply an integer multiple of the estimated timing offset to each of a plurality of high throughput long training field (HT-LTF) symbols associated with the received RF signal to compensate for the timing offset associated with the received RF signal; and
  a channel estimation unit operable to perform channel estimation using the plurality of HT-LTF symbols compensated for the timing offset associated with the received RF signal.

18. The WLAN device of claim 17, wherein the timing offset compensation unit is operable to estimate the timing offset associated with the received RF signal by multiplying the estimated carrier frequency offset with a period of an HT-LTF symbol associated with the received RF signal.

19. The WLAN device of claim 17, wherein the timing offset compensation unit is operable to apply consecutive integer multiples of the estimated timing offset to the plurality of HT-LTF symbols associated with the received RF signal to compensate for the timing offset associated with the received RF signal.

20. The WLAN device of claim 17, wherein the timing offset compensation unit is operable to apply an integer multiple of the estimated timing offset to each of the plurality of HT-LTF symbols associated with the received RF signal to compensate for the timing offset associated with the received RF signal by calculating, for each HT-LTF symbol, a frequency domain phase slope based on a corresponding integer multiple of the estimated timing offset, and multiplying the calculated frequency domain phase slope with a frequency domain representation of the HT-LTF symbol.

21. The method of claim 1, wherein said applying an integer multiple of the estimated timing offset to each of the plurality of HT-LTF symbols associated with the received RF signal comprises applying consecutive integer multiples of the estimated timing offset to consecutive ones of the plurality of HT-LTF symbols associated with the received RF signal.

22. The method of claim 1,
  wherein said estimating the timing offset associated with the received RF signal based on the estimated carrier frequency offset comprises estimating the timing offset by multiplying the estimated carrier frequency offset with a period of an HT-LTF symbol associated with the received RF signal; and
  wherein said applying an integer multiple of the estimated timing offset to each of the plurality of HT-LTF symbols associated with the received RF signal comprises applying consecutive integer multiples of the estimated timing offset to consecutive ones of the plurality of HT-LTF symbols associated with the received RF signal.

* * * * *